340-870.15 SR

XR 3,641,509

United States Patent [19]

Di Vita et al.

[11] 3,641,509

[45] Feb. 8, 1972

[54] DIGITAL DATA ANALYSIS AND DISPLAY DEVICE

[72] Inventors: Philip S. Di Vita, Richboro; Earl N. Powers, Philadelphia; Charles J. Werneth, Newtown, all of Pa.

[73] Assignee: Data Display Systems, Inc., Willow Grove, Pa.

[22] Filed: May 2, 1969

[21] Appl. No.: 821,211

[52] U.S. Cl. ....................340/173 R, 340/147 CN, 324/134, 324/111

[51] Int. Cl. ....................G11c 7/00, G01r 13/04

[58] Field of Search ....................340/147 C, 147 CN, 347 AD; 328/104, 105; 324/111, 134, 112

[56] References Cited

UNITED STATES PATENTS

| | | | |
|---|---|---|---|
| 2,658,142 | 11/1953 | St. John | 340/147 X |
| 2,858,475 | 10/1958 | Blake | 340/147 X |
| 2,980,861 | 4/1961 | Popowsky | 340/147 X |
| 3,059,228 | 10/1962 | Beck et al. | 340/147 X |
| 3,084,287 | 4/1963 | Beadsmoore | 340/147 X |
| 3,364,466 | 1/1968 | Stine | 340/147 X |
| 3,418,460 | 12/1968 | Clemson | 340/347 X |

*Primary Examiner*—Stanley M. Urynowicz, Jr.
*Attorney*—Synnestvedt & Lechner

[57] ABSTRACT

Apparatus for the analysis and display of digital waveforms comprising a commutator arrangement for selectively distributing input information from a plurality of sources to predetermined storage and display units and for selectively modifying the display characteristics of said input information with respect to time, mode of representation and the relative proportion of the cyclic input information signal to be displayed.

11 Claims, 10 Drawing Figures

INVENTOR.
PHILIP S DIVITA
EARL N POWERS
BY CHARLES J WERNETH
Synnestvedt & Lechner
ATTORNEY INVENTOR
PHILIP S. DIVITA
EARL N. POWERS
CHARLES J. WERNETH
BY
Dynnestvedt & Lechner
ATTORNEY

INVENTOR.
PHILIP S. DIVITA
EARL N. POWERS
BY CHARLES J. WERNETH

Synnestvedt & Lechner
ATTORNEY

INVENTOR.
PHILIP S. DIVITA
EARL N. POWERS
CHARLES J. WERNETH
By Synnestvedt & Lechner
ATTORNEY

INVENTOR.
PHILIP S. DIVITA
EARL N. POWERS
BY CHARLES J. WERNETH

Lynnestvedt & Lechner

ATTORNEY

INVENTOR.
PHILIP S. DIVITA
EARL N. POWERS
CHARLES J. WERNETH
BY
Synnestvedt & Lechner
ATTORNEY

DIGITAL DATA ANALYSIS AND DISPLAY DEVICE

The basic building blocks of modern digital systems are integrated circuits, the advantages and capabilities of which have been extensively discussed in the technical literature.

Prior to the development of integrated circuit technology, digital systems were constructed from discrete components. Using discrete components, the circuit designer could exercise control over a number of signal parameters, including: amplitude, rise time, fall time, turn on delay, etc. The transition to integrated circuit technology has had the consequential effect of eliminating almost all of the circuit variability. Thus, once the logician has chosen the particular class of integrated circuits which fit his needs, the signal parameters are fixed and beyond his control. He can no longer vary the rise and fall time of his signals, their delay, or noise immunity. Essentially, all that can be controlled are the logical properties of the signal, i.e., its logical level and the time of transition from one level to the other.

During the period discrete circuit elements were in vogue, very sophisticated measuring instruments were developed for displaying the properties of circuits implemented therewith. The transition from discrete to integrated circuits and the consequent lack of control over formerly controllable logical properties results in the measurement of effects which are largely of academic interest and which are often misleading as to their informational content when such measurements are effected with the more sophisticated measuring instruments mentioned above.

It is accordingly a primary object of the present invention to provide a digital analyzing and display device which functions to display the controllable characteristics of a digital information input signal.

Prior art attempts at anticipating the needs of the digital designer, in addition to being of limited applicability for the reasons outlined above, have in addition lacked the adaptive flexibility of the present invention. In this respect, known prior art techniques have employed means for shifting information bits from memory to a shift register and for displaying the contents of the respective stages thereof.

The latter attempts, in common with the more sophisticated analog devices mentioned above, lack that feature which characterizes the present invention, namely, the ability to display only those parameters of a digital signal which are under the designer's control. These parameters include the direction and spatial or temporal position of signal transitions from one logic level to the other.

Accordingly, it is another principle object of the present invention to provide a digital analysis and display device characterized by its ability to display only those operational characteristics of a digital information input signal which are susceptible to the designer's control.

In large measure, the enhanced operability of the subject system insofar as it concerns the generation of a true representation of the input signal, resides in the fact that the system itself is largely constructed from integrated circuits, thus providing a degree of stability new to instruments of this type.

Another distinguishing feature of the present invention concerns its ability to display input information as a function of time or space. More specifically, input information which represents a time series of data signals emanating from a single source results in a display in which the abscissa of the display units are scaled in time while those of the ordinate are scaled as logic values. The organization of the information distribution circuit comprising the present invention, along with the control circuitry thereof, permits varying the time scale of the abscissa, the abscissa being scaled in terms of clock pulses per display division rather than absolute time.

Accordingly, it is another object of the present invention to provide a digital data analysis and display device wherein means are provided to regulate the time duration of sampled signals per unit of display.

In addition to the above-outlined mode of operation which enables the operator to control the degree of magnification of the input waveform, additional control is exerted over the input waveform in that delay means are provided to enable the user to select the position of origin along the waveform being sampled. This feature, known as the display delay selector, introduces a delay interval between the occurrence of a trigger signal initiating the display cycle and the beginning of the delay.

Accordingly, yet another object of the present invention concerns means in association with a digital analysis and display device for delaying the origin of the waveform being displayed to a particular point along the waveform being monitored.

In the implementation of the preferred embodiment of the present invention digital signals, as sensed by the signal probes, are transferred into a commutator which functions to distribute the digital signals on a time basis to storage elements each having associated therewith a two-level display device.

The commutator also functions to time share the control and distribution circuitry of the system between several independent signal sources and display registers thus facilitating the simultaneous display of information from a plurality of signal sources. The commutator is organized to sample the digital input signals from the various independent signal sources in a time-ordered sequence. Thus, the signal probe associated with a particular source of input signals is operatively connected with the commutator for a period of time corresponding to the time required to transfer the input information to the storage elements whereafter the commutator becomes operatively connected with another signal source for effecting the transfer of similar digital information into a separate storage and display register.

Although the digital information from the plural signal sources is sequentially sampled and available for the updating of the display registers on that basis, the stored information is simultaneously available for display purposes. The number of display registers operatively connected to the commutator determines the servicing rate. It is possible to organize the commutator on a priority or a preferred distribution basis, whereby certain display registers may be serviced, i.e., updated more often than others. Another alternative would be to service the display registers on a demand basis such that information associated with a specific signal source would remain on display for so long as the probe remained operatively connected to the source of signals or until a change in the previous representation is sensed. Multiplexing techniques for effecting the above-outlined modes of time sharing are well known, it being the standard practice in the implementation of digital processors to utilize such hardware-saving innovations.

What is deemed to be novel in the implementation of the present invention, insofar as the commutator arrangement is concerned, is the manner of generating the control signals for effecting the controlled transfer of the input signals from the signal sources through the commutator to the storage and display registers. In this respect, the implementation of the present invention provides means for controlling both the relative percentage of a waveform to be viewed as well as the relative portion or portions thereof. More specifically, when the subject of the present invention is operative in the serial mode, the signals generated by the circuit being monitored may represent a waveform of arbitrary duration. The logician may be concerned with but a portion of the total waveform. The control facilities afforded by the present invention enable the logician ro view just that portion of the waveform he is interested in. Thus, the total waveform may be thought of as being viewed from a window with the viewer having exercisable control over the width of the window as well as its relative position along the overall length of the waveform.

In the parallel mode of operation of the present invention, the input information may be constituted of selected bits of information generated at independent points of the circuit being monitored. In this implementation, the horizontal scale of the display register may be viewed as a spatial representation of the input information. In such implementation, a plurality of probes are utilized for inputting information in a serial-parallel mode into the display register. Such parallel mode representations are particularly convenient for viewing the contents of devices such as storage registers.

The features of the present invention which make the aforementioned modes of operation possible include the unique design of the control unit responsible for generating the timing signals within the subject system.

The control unit is responsible for generating and transferring gating signals to the operative components of the present system to thereby effect the interchange of information in the desired sequence.

The control unit is conditioned by a triggering signal, either externally or internally generated, to thereby permit clocking pulses from an external or internal source, to be gated into a pair of preset counters: a display counter and a delay counter. The function of the delay counter is to determine the location of the leading edge of the portion of the waveform to be viewed (i.e., the position of the window) while the display counter controls the duration of transfer of digital information bits through the commutator to the storage and display registers once the transfer has been initiated (and thus controls the width of the window).

Upon completion of the counting cycle of another counter of the control unit, i.e., the internal display counter driven from the display counter, a control signal is generated within the control unit and transferred to the commutator to effect the transfer of the accumulated information bits on the lines thereof into the corresponding positions of the storage registers. At the completion of the transfer operation, a control signal generated within the control unit advances a counter associated with switching means connected to the input to the commutator whereby the subsequent operating cycle of the subject system will be utilized for inputting digital input signals into another one of the plural display registers of the subject system.

In addition to the fundamental components of the subject system as outlined above, there exist in the preferred embodiment of the present invention additional features which complement the above-outlined mode of operation thus increasing the flexibility of the subject system. The first of these is a spike detector which furnishes an indication of the presence of signals otherwise too short to be displayed. The lower limit of the spike detector corresponds with the response speed of the gating circuitry and is thus functionally operative in the present invention to denote pulses whose duration is less than the display duration intervals and greater than the minimum response speed of the gating circuitry which in the preferred embodiment of the present invention is on the order of 10 nanoseconds.

A second convenience feature of the present invention is the periodicity comparator. The periodicity comparator compares the periods of the sample signal used in the commutator with that of the input information signal. If these two signals are not harmonically related, an error signal is generated. The significance of the periodicity comparator lies in the fact that the subject invention displays only portions of a waveform corresponding to discrete intervals of time. Thus, the selection of a display rate which is not harmonically related to the input information signal may result in an incorrect replica of the input signal.

The fact that the display pattern is not an exact replica of the input signal will in many instances be unimportant, particularly when the disparity concerns the relative time proportions of the signal; however, there are applications where it is desirable that the display patterns be exact replicas of the input signal and the operator will then have to select a clock frequency integrally, or harmonically, related to the input signals. Means are provided in the preferred embodiment of the present invention to facilitate the matching of the input signal and the sampling signal in the commutator.

Another convenience feature of the present invention concerns a display mode control capability which determines the type of information to be displayed. In its simplest form, the display mode control portion of the present invention either routes the normal data input, or the output from the spike detector to the display input. In more complicated systems, the display mode control is capable of selecting singular attributes of a signal source or simultaneously from plural signals.

Another feature of the subject invention which accounts for its enhanced operability insofar as it concerns the generation of a true representation of the input signal, resides in the fact that the system itself is largely constructed from integrated circuits thus providing a degree of stability new to instruments of this type.

The probes used in conjunction with the present invention, like the display system itself, are optimized for use in conjunction with integrated circuit techniques. As such, the probe structures embody significant electrical and mechanical improvements, which improvements are set out in the copending application of the same inventors entitled PROBE STRUCTURE, filed May 2, 1969, and bearing Ser. No. 821,288.

In the parallel mode, the probe structure for monitoring the input information constitutes a special configuration which permits the simultaneous sampling of 16 signals per trace. The 16 signal probe structure is not to be construed as a limitation of the system, in fact, the system can be expanded appreciably without essential modification other than to the probe structure and display elements themselves. Likewise, the preferred embodiment of the present invention is equipped to display four digital information input signals simultaneously; however, the total number of signals which may be displayed is arbitrary as is the portion of the waveform displayed and the length of the display representation thereof.

The various objects and advantages of the invention will be fully understood upon reference to the following detailed description of the preferred embo;iment of the invention when taken in light of the accompanying drawings in which is shown, in diagrammatic fashion, a digital data analyzing and display system constructed in accordance with the teachings of this invention.

In the drawings:

FIG. 4 is a diagrammatic representation of a storage and display register utilized in the implementation of the present invention;

Figure 1:
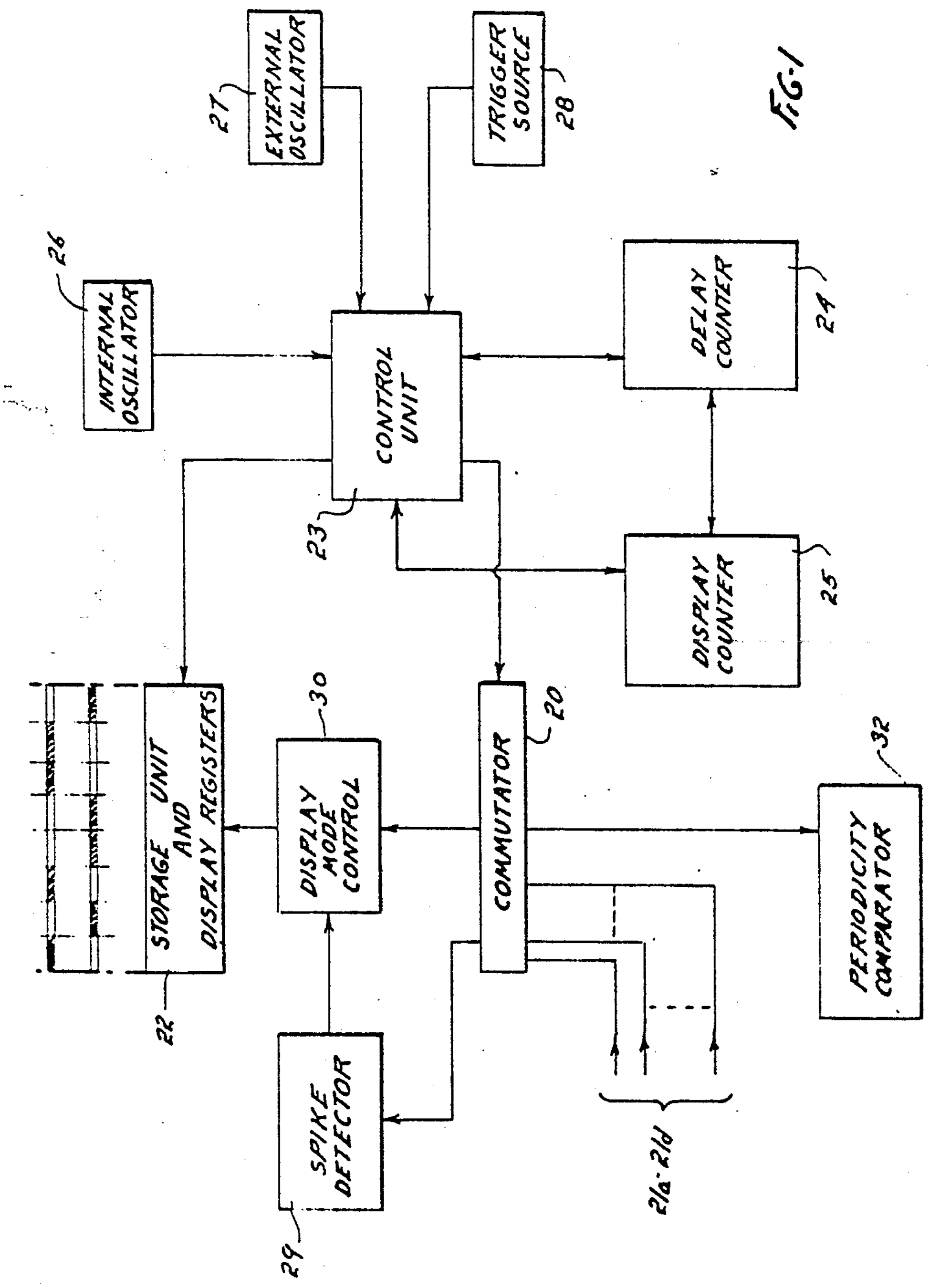
FIG. 1 is a diagrammatic representation of the major components of the present invention.
Figure 2:
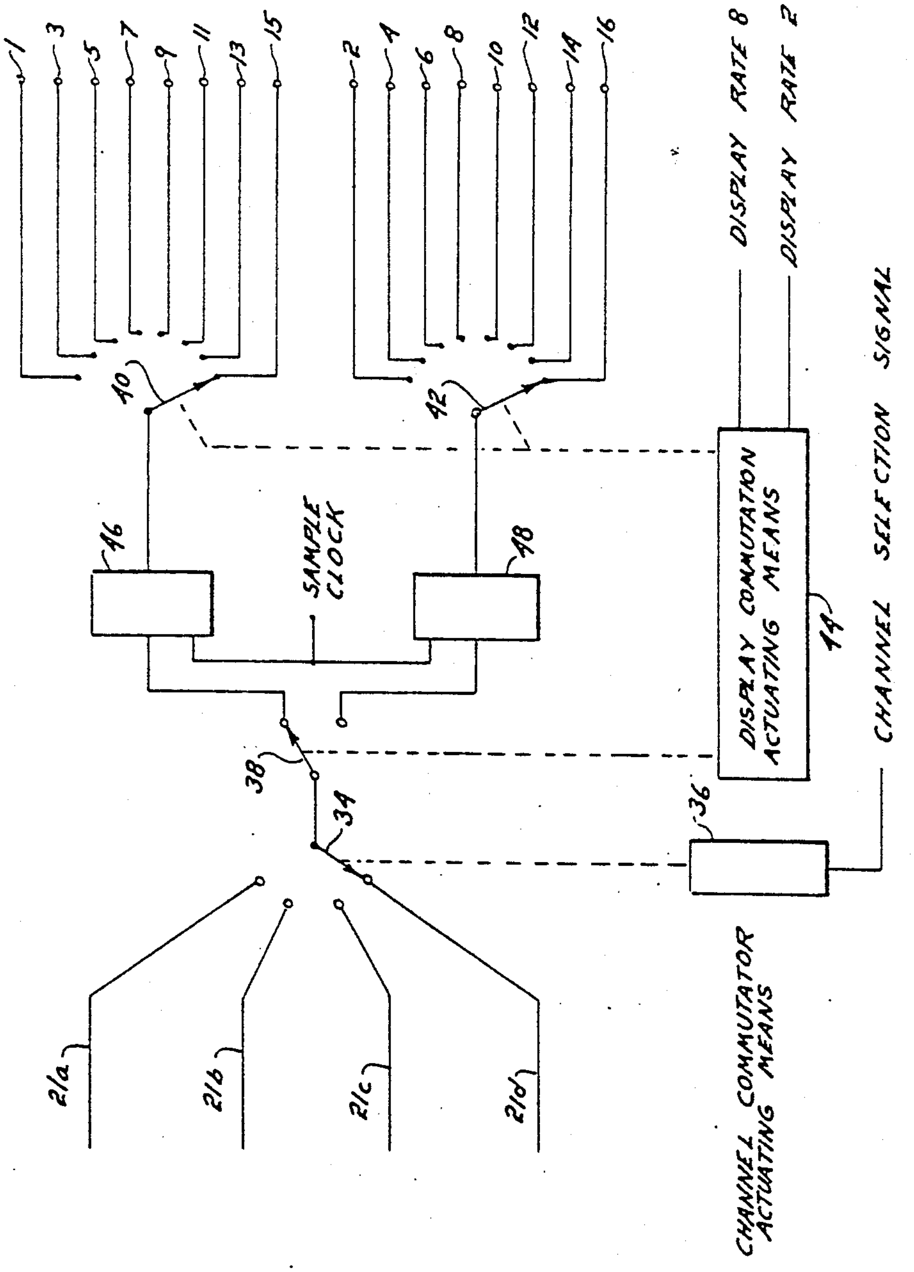
FIG. 2 is a detailed description of the implementation of the commutator of FIG. 1.
Figure 5:
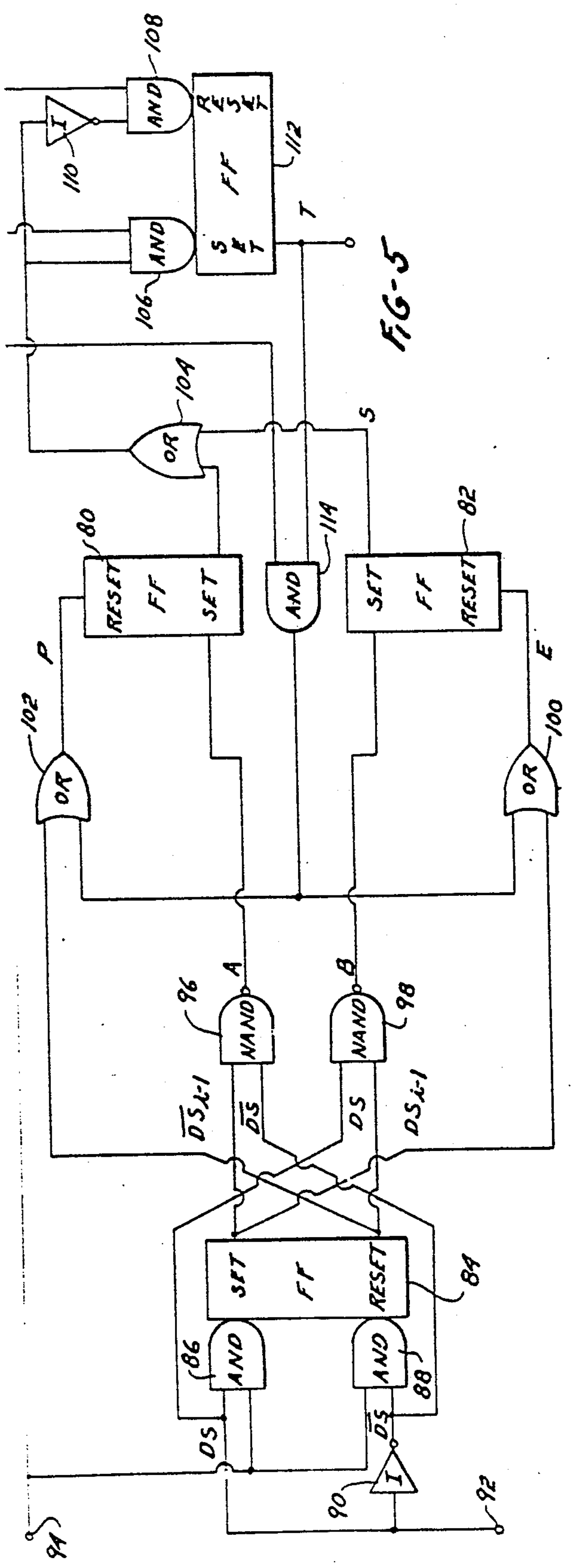
Figure 5B:
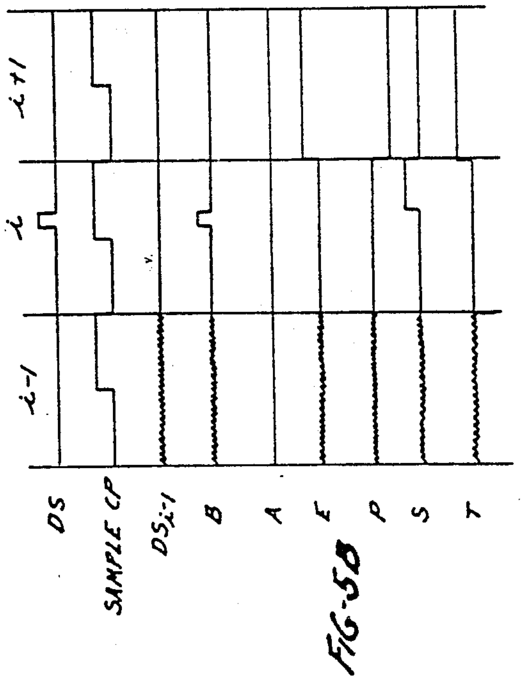
Figure 5A:
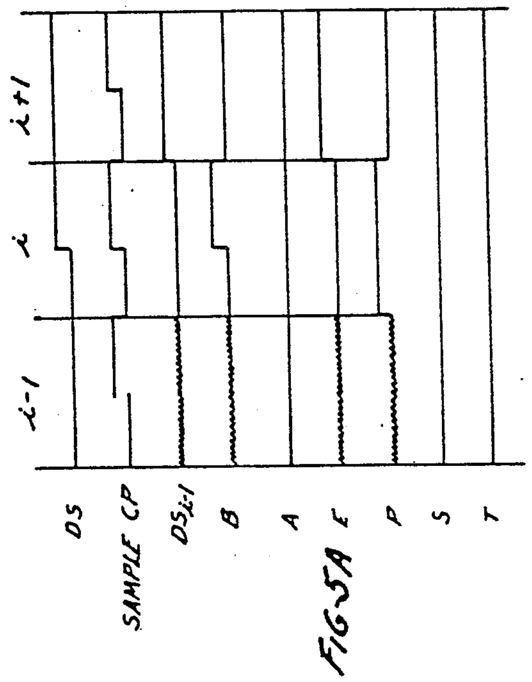
Figure 6:
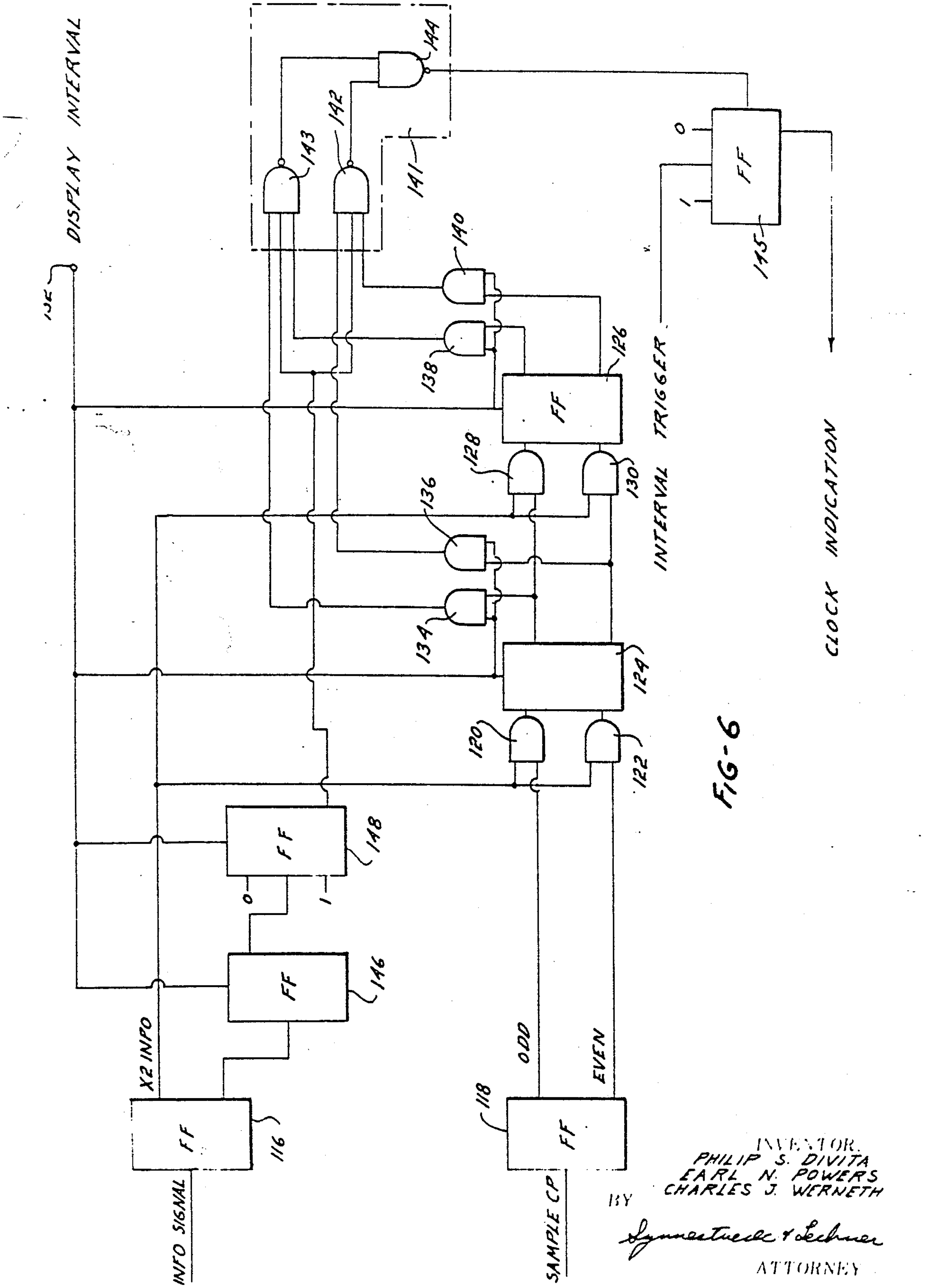

FIGS. 5, 5A and 5B disclose a detailed description of the logic required to implement the spike detector of FIG. 1 including exemplary timing diagrams therefore;

FIG. 6 is a detailed description of the periodicity comparator of FIG. 1; and

Figure 7:
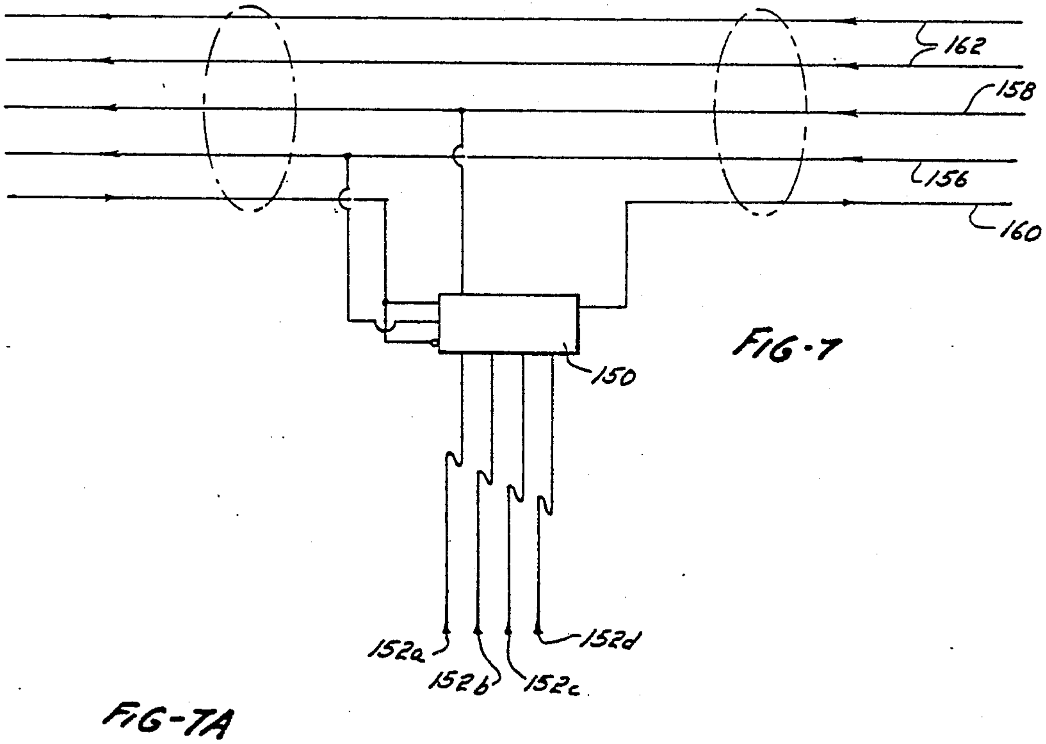
Figure 7A:
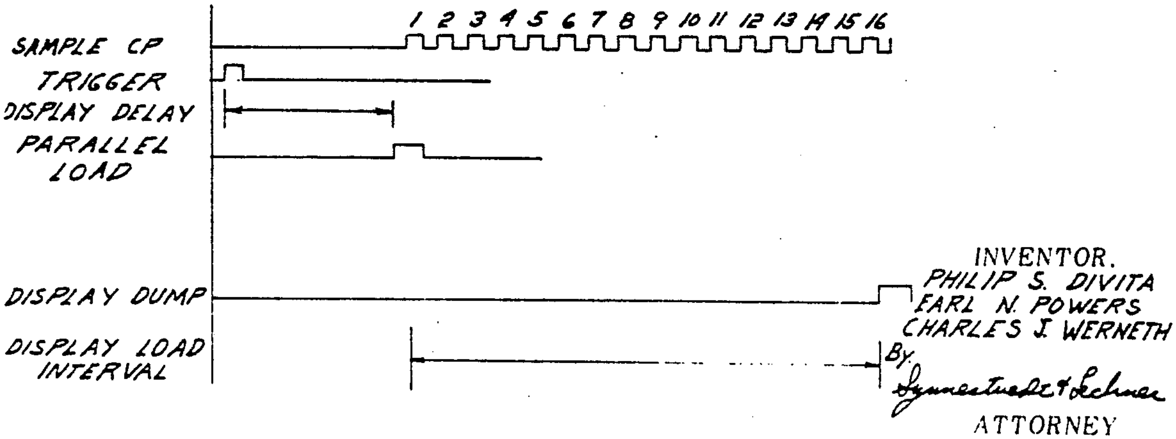

FIGS. 7 and 7A disclose a diagrammatic representation of a parallel probe structure, and timing diagram therefor, as utilized in the implementation of the present invention.

In considering the drawings, reference will first be made to the diagrammatic representation of FIG. 1 which discloses a general arrangement of the major components of the invention. An explanation of the relative arrangements of these components will be given before a detailed description of their structure is begun.

Central to the organizational philosophy of the present invention is the commutator 20 which as indicated above functions in the capacity of switching means to selectively interconnect the plural probe structures 21 to a corresponding one of a plurality of storage and display registers 22. The aforementioned selective switching operation within the commutator 20 is effected under the control of signals generated within the control unit 23. The control unit 23 controls, and is in turn controlled by, a pair of decade counters 24 and 25.

The counter 24, the delay counter, effects a delay in the transfer of input information through the commutator to the storage and display registers, the delay being measured from an arbitrary trigger point on an input waveform. Counter 25.

the display counter, controls the sampling rate of the input information signals. As such, signals from the display counter 25 condition the commutator 20 in such a manner that input signals being gated into the commutator 20 are periodically sampled at the predetermined rate registered by the display counter.

All synchronous systems employ a basic clock which serves as the ultimate source of system timing. The clock output provides an artificial time base for the entire system; as such, signal transitions can occur only at the discrete intervals of time defined by the clock. For maximum flexibility, the subject system is designed in such a manner that a timing signal utilized to control the sampling of information for display purposes may be generated from an internal clock, the oscillator 26 of FIG. 1; or an external clock indicated as member 27 of FIG. 1. It is thus possible to use as the source of the clock signals the external clock used to generate the signals being displayed. In this latter mode of operation, the display rate is inherently as stable as the timing used to generate the input information to be displayed.

A source of trigger signals, identified as member 28 in FIG. 1, is operative in conjunction with counters 24 and 25 to control the sampling of input information by the commutator 20.

As indicated above, a spike detector 29 is connected in the output circuit of the commutator to sample and record signals otherwise too short in duration to be displayed in the display register. The spike detector 29 is connected to the storage and display registers by way of a display mode control member 30. The relatively fast response time of the input circuitry in the subject system makes it feasible to provide alternative modes of operation in addition to the direct display mode mentioned above. In this respect, there is in addition to the spike detection mode of operation other alternatives including a mod two mode of operation which when combined with other features of the present invention provides a means for comparing two waveforms and noting any inconsistencies therein. Another alternative as to mode of operation, includes the display of specific attributes of input signals from one or more sources.

Although digitally encoded information, particularly of the binary encoded version, lacks the detailed complexity of analog signals and their characteristic waveforms, such logic signals may nevertheless structurally be very complicated. At the same time, they may contain a great deal of information which is meaningless to the user. Often the important attributes, are, if not actually hidden, at least obscured by the complexity of the signal. One of the basic principles underlying the subject system is that of displaying only those attributes or digital signals which are of use to the logical designer or digital engineer. Particular emphasis has already been stressed on the logic level and time of transition occurrence within the present system. Although these are perhaps the most commonly used attributes of digital signals they are not necessarily the only ones of interest to the logic designer.

Examples of other signal attributes which may be of importance include the time consideration of how quickly signals change from one level to another. Thus, it may be necessary to know whether the rise time of a signal within a flip-flop, or other multilevel device, is within certain predetermined limits. Other determinative signal attributes might include the delay time of a particular circuit; the ratio of noise-signal amplitude v. threshold value of a particular device; the time overlap of two independent signals; and a measure of the relative position of signal transitions with respect to the occurrence of clock signals for determining race-free combination components. The foregoing are just a few of the many attributes of a signal, or a combination of signals, which may be realistically realized by the subject invention. These and other such measurements are facilitated by the display mode control which in effect constitutes switching means for logically conditioning the system to respond in the desired manner. The various modes of operation may be programmed into the system by conventional hardware or software program packages operative through control unit 23.

A periodicity comparator 32 is connected to the commutator 20 and operates to monitor the input signals being sampled to insure that no input information is lost due to nonsynchronization of the input and sampling signals.

An appreciation for the operation of the total system of FIG. 1, will be gained by reference to the explanation given with respect to FIGS. 2 through 7 which disclose detailed implementations of various aspects of the diagrammatic representation of FIG. 1. In this respect, reference is first made to FIG. 2 which constitutes a diagrammatic representation of the commutator 20 of FIG. 1.

The leads 21*a–d* represent input lines from the four probes utilized in the implementation of the preferred embodiment of the present invention. The leads 21*a–d* are shown as connected to a first level of commutation depicted by the switch 34. Switch 34 serves to time share the distribution circuits of the commutator between the various sources of the input signals. Thus, switch 34 is operatively connected to channel commutation actuating means depicted diagrammatically in FIG. 2 as member 36.

Although the channel commutator has been depicted as a combination of mechanical switching and actuating means, it should be understood that in the actual implementation very fast gating logic may be used to implement this portion of the system without necessitating design changes from that utilized with the mechanical switches. It should be readily apparent to one having ordinary skill in the art, how such gating circuitry might be implemented. Conventional gating structures are also available to provide the desired commutator action.

The second level of commutation is effected by the switches 38, 40 and 42 which function in a cooperative manner to handle the serialized input information coming into the commutator on one of the input leads 21*a–d*. The second level commutator action afforded by switching means 38, 40 and 42, is effected by display commutator actuating means 44. Both the channel commutator actuating means 36 and the display commutator actuating means 44 are connected to the control unit 23 of FIG. 1, from whence they receive the requisite control signals to step their associated switches through their respective steps. The second level of commutation, i.e., the display commutator, utilizes dual transfer paths to reduce the switching requirements of certain of the components. This reduction in switching action occurs without a corresponding reduction in operating speed somewhat at the expense of added hardware. This technique could be further extended such that the two-position switch 38 could be replaced by a four-position switch thus further reducing the number of contacts serviced by each of the switches 40 and 42. Such modification would however involve additional hardware including two buffer flip-flops in the nature of those indicated in FIG. 2 as members 46 and 48 as well as two additional switches in the nature of members 40 and 42. The buffer flip-flops, 46 and 48, are interposed between the switch 38 and the switches 40 and 42 in the display commutator to insure synchronization between the input signals, the sample clock signal emanating from the control unit 3 of FIG. 1, and one or another of the switch contacts 40 and 42 which cooperate with a particular one of the multiple output leads 1–16. Thus, the buffer flip-flops 46 and 48 function to provide an exact time reference for data to be sent through the commutator.

In the operation of the commutator, a control signal from the control unit 3 conditions the channel commutator actuating means 36 such that switch 34 is positioned to a particular one of the multiple input sources 21*a*–21*d*. Switches 40 and 42 are initially set to output leads 1 and 2 respectively. The switch 34 is initially positioned as indicated thus enabling the input signals from the selected one of the multiple input sources to transfer information into buffer flip-flop 46. The first sample clock signal triggers the output of the flip-flop 46 which in turn is delivered via switch 40 to output line 1. Meanwhile a control signal is generated in the control unit 3 to initiate the switching of switch 38 such that the serial stream of information signals is thereafter transferred into the buffer flip-flop 48. Upon the occurrence of the second sample clock signal the contents of the buffer flip-flop 48 is transferred via switch 42 to output line 2. During this same time, the switch 40 is repositioned to output line 3 such that during the next phase of the transfer cycle, switch 38 will be repositioned to condition the buffer flip-flop 46 such that upon the occurrence of a sample clock signal, the latter transfers its contents to the output line 3. In this manner information signals are transferred to all 16 output lines whereafter a signal is generated in the control unit 3, and transferred to the channel commutator actuating means 36, to reposition the switch 34 to another one of the input lines 12*a*–12*d*.

Figure 3:
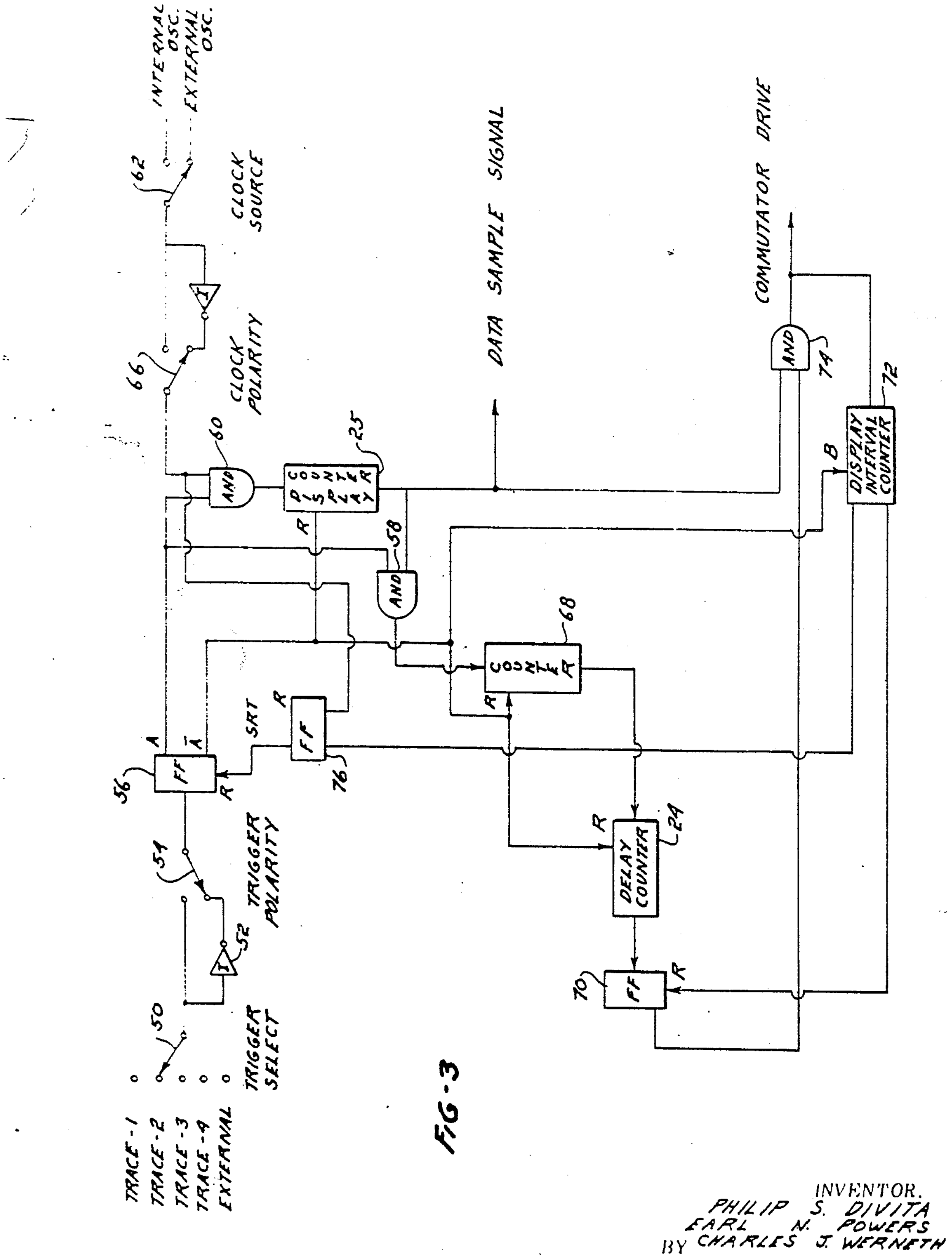
FIG. 3 is a detailed description of the control unit of FIG. 1.
Figure 9:
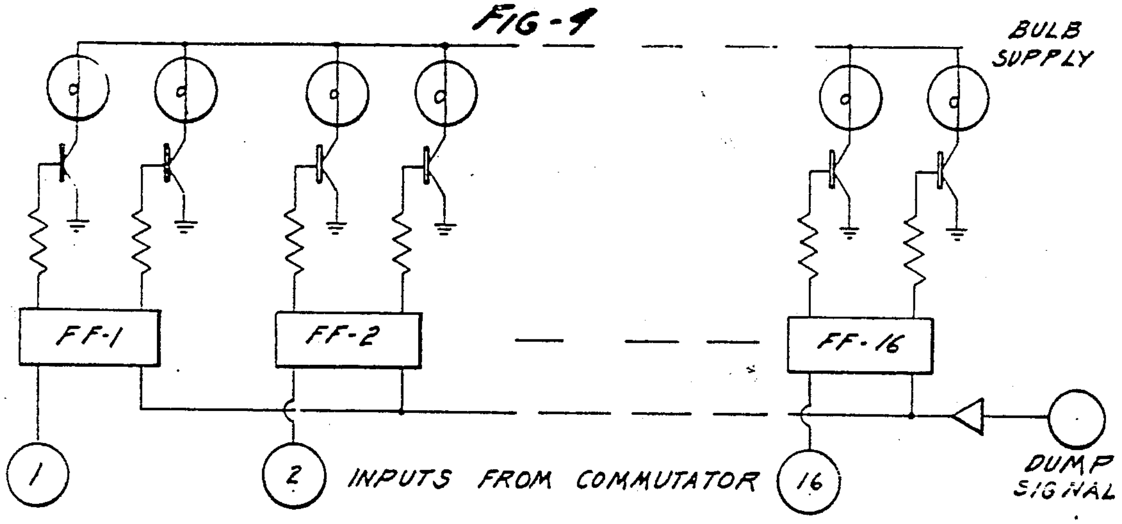

Reference is now made to FIG. 3 which discloses a block diagram of the control unit 3 of FIG. 1. A display cycle is initiated by a trigger signal which has been discussed with respect to FIG. 1 as emanating from a trigger source 28. The trigger source 28 may alternatively be generated internally or emanate from some source external to the logic of the present system. The trigger signal may also be periodic. The trigger signal functions to define a time reference from which all events may be measured.

For purposes of this invention, the trigger signal may be considered as having as its source an external waveform the polarity, as well as the source, of which is switch selectable by means of switch 50. An inverter 52 in conjunction with switch 54 provides polarity selection means for the trigger signal.

A flip-flop 56, is included in the preferred embodiment of the present invention, and is responsive to the negative going edge of the aforesaid trigger signal to switch states whereby an output appears on the line A. The A output of the flip-flop 56 conditions AND-gates 58 and 60 which in turn initiate operation of the delay in display counters 24 and 25 respectively. Simultaneously, reset signals generated by the A output of the flip-flop 56, will be withdrawn. A clock signal either from the external or internal oscillator, 27 or 26 respectively of FIG. 1, will be gated into the display counter 25 via AND-gate 60. Switch 62 is provided for selecting the source of clock signals while an inverter 64 and switch 66 make possible the polarity selection of the clock signal.

With AND-gate 60 conditioned, the display counter 25 will count down from its preset value to 0 whereupon an output signal will be generated to sample the input data. The output signals from the display counter 25 also function to advance switches 38, 40 and 42 of the commutator of FIG. 2.

The output of the display counter 25 also functions indirectly to drive the delay counter 24. The control signals for modifying the preset count of the delay counter 24 is effected by decreasing the count in the delay counter 24 once every 10 sample pulses generated by the display counter 25. Means for effecting the latter operation include counter 68 connected in the output circuit of the display counter 25 and the input circuit of the delay counter 24 such that an output signal is generated for every tenth input signal.

When the preset count in the delay counter 24 has been decreased to 0, an output signal therefrom is effective in setting the flip-flop 70 to its set condition. When this occurs, the output of flip-flop 70 releases the display internal counter 72 and also conditions gate 74. The gate 74 is the commutator drive gate, which when conditioned, permits the data sampling signal to gate the output from the buffer flip-flops 46 and 48 of FIG. 2. The output of the gate 74 is also used as a source of drive signals for the display commutator actuating means 44 of FIG. 2.

The design of the display interval counter 72 is such that its period is substantially longer than the 16 display intervals required to load one bank of storage registers of the subject system. The output of the display interval counter 72 is utilized to dump the contents of the storage flip-flops associated with the output of the commutator of FIG. 2 into the storage and display registers 14 of FIG. 1. The extended cycle of the display interval counter ensures that the duration of the dump signal will be adequate to accommodate the transfer without loss of information. When the display interval counter reaches its final stage an output signal is generated therefrom which conditions flip-flop 76 which in turn will reset flip-flop 56 thus resetting all of the control unit counters. Flip-flop 76 is automatically reset at this time so that the system will await its next operative cycle.

The decade counters constituting the delay counter 24 and the display counter 25 of FIGS. 1 and 3 are similar in structure having heretofore been introduced as preset counters of a conventional design. Each consists of a cascade of decade counters which are preset by thumbwheel switches to a state corresponding to the number of input pulses required to cause the counter to recycle. The input pulse train will cause the counter to count toward its zero state; when it reaches its one state, a reset cycle will be initiated. On the next clock input signal the counter will return to its preset value and begin a new cycle. Preset counters of this type are well known in the art and need not receive a detailed analysis here.

Reference is now made to FIG. 4 which discloses the storage and display register portion 22 of FIG. 1. It should be understood that each waveform to be displayed will require a bank of storage flip-flops of the type shown in FIG. 4 as members FF1, FF2 . . . FF16. In the preferred embodiment of the present invention, there are means for simultaneously displaying four input waveforms; therefore, four such storage and display register banks and associated flip-flops would be required. It should be obvious that it would be a simple matter to increase the number of such register banks and or the number of stages in each. Connected as conditioning means to the input of each of the flip-flops FF1–16 is a corresponding one of the output leads of the commutator, as previously indicated in the explanation of FIG. 2. Also connected as conditioning means to the respective flip-flops FF1–16, is the source of dump signals which accompanies the transfer of information from the commutator. The design utilized in the preferred embodiment of the present invention, whereby the output of the commutator is used directly to drive the storage flip-flops, greatly reduces the speed requirements on the storage devices. Consequently, these devices can be constructed of low-power, low-speed and low-cost units.

Connected to both the outputs from the set and reset side of each of the storage flip-flops FF1–16, are two indicator lamps with associated driver circuitry. A separate flip-flop is provided for each display division of the subject system; thus, the complementary outputs from the flip-flops provide directly the signals required to light the two indicator lamps corresponding to each display division. The driver circuits are supplied from a separate power supply particularly designed to satisfy the requirements of the indicator lamps.

Reference is now made to FIG. 5 which discloses the spike detector portion of the present invention. It is the function of the spike detection system to detect the presence of signal levels whose duration is less than that of a display division. Thus, if the display rate is chosen to be 100 clock cycles of the internal clock per display division and the internal clock has a frequency of 20 mHz., each display interval will have a duration of about 0.5 microseconds. If an input signal should contain pulses which are only 0.25 microseconds in duration, the spike detection system will respond provided that the pulses are greater than some lower limit imposed by the response speed of the detection circuitry. In the implementation of the present invention this lower limit is approximately 10 nanoseconds.

The logic employed in the implementation of the spike detector includes two flip-flops 80 and 82 which include very fast response circuitry and which trigger on the trailing edge of all short transients. The gating circuitry interposed in the input to the flip-flops 80 and 82 conditions the incoming signals so that the transitions are of proper polarity to trigger the associated flip-flops. The gating circuitry to the right of the flip-flops 80 and 82 serves to stretch the duration of the spike indication to a full clock interval so that they may be used to light a spike indicator light or as an input to the display panel.

The conditioning logic for the flip-flops 80 and 82 includes a flip-flop 84 having associated with the inputs thereof, gating devices 86 and 88. Also connected to the input of the gating device 88 is an inverter 90. Both sides of the flip-flop 84 are connected to a source of data signals by way of the terminal 92. The data signals will be clocked into the flip-flop 84 by each positive going edge of the sample clock signal appearing on terminal 94. The polarity of the data signal will determine which of the AND-gates 86 or 88 is conditioned and thus whether the flip-flop 84 will be thereafter in its set or reset state. The flip-flop 84 serves as a one-bit storage register which remembers the logical value of the data signal during the previous display interval. Thus, if the data signal were a logical 1 during interval $i-1$, the occurrence of a spike will be identified by recognizing the positive going edge of the data signal during interval $i$. Similarly, if the data signal were a logical 0 during the interval $i-1$, a negative going transition during interval $i$ would signify a spike. Since both flip-flops 80 and 82 can respond only to positive going transitions, the data signal must be inverted in the former case before it is applied to flip-flop 82, but not inverted in the latter case. The flip-flop 84 and the associated gating structure including NAND-gates 96 and 98 provide the means for effecting the selective inversion.

An explanation of operation of the spike detector circuitry of FIG. 5 is best facilitated by reference to the timing diagrams of FIGS. 5A and 5B. FIG. 5A pertains to the situation in which a transition occurs in the $i$th interval and which extends over the interval boundary, i.e., into the $i+1$ interval. Since the spike detection circuitry is designed to detect only those narrow pulses which would not normally affect the system's display, the spike detection circuitry is not expected to respond in the present situation. Thus, as the data signal DS is applied to the terminal 92 during the $i$the interval, the positive transition of the waveform partially conditions AND-gate 86. The input of the periodic sample clock signal to terminal 94 completes the conditioning of AND-gate 86 which in turn acts to set flip-flop 84. Meanwhile, the positive going transition of the data signal during the $i$th interval has completed the conditioning of AND-gate 98. This occurs since the other input to NAND-gate 98, namely, $DS_{(i-1)}$, remains 0 through the $i$th interval. The output of NAND-gate 98 will thus appear as a positive going transition of the data signal DS during the $i$th interval. The output of NAND-gate 98 is the signal B which remains "up" during the balance of the $i$th interval. Since the flip-flops 80 and 82 are responsive to the trailing edges of gating signals, the output of NAND-gate 98 in the present instance would not affect the setting of flip-flop 82 until the end of the $i$th interval; however, at that time, the flip-flop 84 has been stabilized in its set condition in response to the input signal DS for the $i$th interval and its output has been buffered through OR-gate 100 to reset flip-flop 82, thereby preventing a spike indication. A negative going transition during the $i$th interval would be inverted by the inverter 90 and thereafter handled by NAND-gate 96, OR-gate 102, and flip-flop 80 in exactly the same manner.

FIG. 5B is a timing diagram for a typical spike situation; that is, wherein the signal transition during the $i$th interval does not extend across the interval boundary. In this situation, the positive going transition of the data signal during the $i$th interval conditions NAND-gate 98 in the manner outlined above, thus generating an output signal, B. The short duration of the data signal causes the value of the output signal, B, to return to 0 within the boundaries of the $i$th interval and prior to the time flip-flop 82 has been stabilized. Accordingly, the negative transition of B switches flip-flop 82 to its set state thereby generating the signal S which will last to the end of the $i$th interval. The signal S is buffered through the OR-gate 104 and partially conditions the gating circuitry comprising AND-gates 106 and 108, and inverter 110, such that upon the occurrence of the negative going edge of the sample clock signal the gating conditions are satisfied and the flip-flop 112 is switched to its set state. The output signal from the flip-flop 112, in addition to actuating a spike indicating light (not shown), is gated through AND-gate 114 and OR-gates 100 and 102 to reset the appropriate one of the flip-flops 80 or 82.

It should be noted that the preferred embodiment of the spike detector system has a dead time corresponding to one-half the sample clock signal interval immediately following the display interval in which a spike is detected. It is during this period that the signal T is effective in resetting the flip-flops 80 and 82. This dead time could be reduced by using a narrower reset signal such as might be derived from a fast monostable device. Such implementation should be obvious to one having ordinary skill in the art.

Since the present invention concerns the spatial or time oriented display of input waveforms wherein sampling techniques are utilized to visually project an indication of the sample of the signal over discrete intervals, it becomes necessary in order to ensure the faithful reproduction of the input waveform, to realistically relate the duration of the sample to the portion of the input waveform represented thereby so that the sample realistically reflects the informational content of the corresponding portion of the waveform. In the analysis and display of digital waveforms, the possibility of losing information due to a disparity in the sampling and input signal rates is minimized by the spike detector circuitry discussed in detail above. However, an additional consideration in analyzing digital waveforms is the necessity to ensure that a sample pulse train and the input signals are either harmonically or integrally related.

The spike detector circuitry partially resolves this problem in that if the display division is greater than some fraction of the signal period, the spike detector circuitry will respond. Thus, the spike detector is operative in the situation wherein the period of a display division is greater than an information interval of the display signal. However, the spike detector will not respond when the clock period is less than that of the information signal. In such instances additional test circuitry is necessary, this being the subject of the periodicity comparator of FIG. 6.

The periodicity comparator of FIG. 6 compares the number of clock boundaries in each cycle of the input signal to that of the input signal to thereby detect the lack of an harmonic relationship. It can be shown that where the clock period is less than that of the information signal, the interval may contain either an odd or even number of transitions. Similarly when the clock period is greater than the signal period, a clock cycle of the data signal waveform may contain one or no clock signal boundaries. By means of an odd/even counter, the number of clock boundaries per input signal may be detected. If the odd/even quantities differ in adjacent information clock cycles an indication of a nonharmonic relationship exists.

Referring to FIG. 6, therein is disclosed a pair of flip-flops 116 and 118. Flip-flop 116 responds to successive information signals while flip-flop 118 responds to successive sample clock pulses. Each pair of signal changes inputted into the flip-flop 116 defines the boundaries of an information signal. Within these boundaries, the flip-flop 118 may register one or more clock signal boundaries. The flip-flop 118 retains an indication of the odd or even nature of the number of clock pulses occurring during the period defined by the boundaries of an information signal. After every two information signal input pulses, the flip-flop 116 conditions AND-gates 120 and 122 to thereby gate the odd or even condition of the flip-flop 118 into flip-flop 124. At this same time, the previous contents of flip-flop 124 are transferred into flip-flop 126 by means of AND-gates 128 and 130. At the end of each display interval, a display interval signal is applied to terminal 132 to thereby complete the conditioning of AND-gates 134–140 thereby simultaneously gating the current contents of flip-flops 124 and 126 into a comparator 141, consisting of NAND-gates 142, 143 and 144. Since the contents of the flip-flops 124 and 126 represent the odd or even nature of sample clock pulses which have occurred within adjacent information signal boundaries, any failure of the two signals to compare, results in an output of the comparator 141 thereby setting flip-flop 145 and indicating a lack of a harmonic relationship between the information signal and sample clock pulses. Flip-flops 146 and 148 are responsive to the first of the two signals defining the information signal interval to inhibit the comparison gates until two information intervals are completed and the contents of flip-flops 124 and 126 are ready to be compared.

When the subject system is operative in the parallel mode each of the display intervals of the storage and display registers are related to a separate signal source. As such, multiple probe structures are required to monitor the plural sources. A block diagram of the logic structure of the parallel input probe is shown in FIG. 7. The probe contains a four-bit shift register 150, of conventional design. The signal inputs to the shift register may be either serial or parallel in nature. In this respect, parallel information is inputted into the shift register by way of the input leads 152*a*–152*d*. Serial input into the shift register is provided by means of the input lead 154. Control inputs to the shift register 150 comprise a clock signal on lead 156 and a parallel load signal on lead 158. Output from the parallel probe structure is provided by way of the output lead 160. In addition to the foregoing inputs and outputs, there are a set of power leads to the probe structure represented in FIG. 7 as member 162.

The basic four-bit shift register of FIG. 7 can be cascaded with other similar registers by connecting the output from one such unit to the input of the next. The separate sections or modules of the parallel probe are thus interconnected so that an arbitrary number of parallel inputs, up to a maximum of 16 in the preferred embodiment, can be used.

Atypical timing sequence for the parallel probe structure, operative in conjunction with the system of FIG. 1, is shown in FIG. 7. Thus, at some arbitrary time the system will receive a trigger signal from the trigger source 28 and the display delay circuitry including the control unit 23, the delay counter 24 and the display counter 25 will be energized just as in the case of the processing of serial data. At the completion of the desired display delay, a signal is generated on the parallel load lead 158 and the sample clock signal lead 156. On the next positive going edge of the sample clock signal, the data on the parallel input leads 152*a*–152*d* will be loaded into the shift register 150 as well as into the corresponding shift registers of the other three modules comprising the complete parallel probe structure. At the completion of the parallel load signal, a series of 15 sample clock pulses will be used to shift the data from the shift register modules into the commutator 20 of FIG. 1 and from thence to the storage and display registers 22 in response to the display dump signal, just as in the serial mode.

It is possible utilizing the parallel probe structure of FIG. 7 to display less than 16 sample intervals utilizing two parallel probe modules in the nature of that disclosed in FIG. 7. In such applications, the input cable from the second unit would be terminated so that serial data input signals to the second unit would be held at a logical 0. Thus, when the 16-bit shift sequence occurs, the information bits read into the two cascaded probe structures would be transferred to the commutator and from thence to the display. As the information bits are shifted into the display unit, zeros will be shifted into the input of the second shift register modules and from there into the terminals corresponding to bit positions 9 through 16. Thus, the display in this case would consist of the 8 information bits followed by 8 zero-level bits.

The mechanical structure of the parallel probe is such that the modules are readily interchangeable and easily cascaded. The parallel probe structure differs from that disclosed in the aforementioned U.S. Pat. application of the same inventors used in the serial mode in that it need not contain an integrated circuit logic pack. Consequently, the parallel probe can be considerably shorter and narrower than the serial probe. As such, the basic unit containing the shift register module is in the form of a small cylindrical package terminated on either end by a connector of the same type as used on the inputs to the display unit. Four short leads enter the package perpendicular to the axis of the cylinder. These leads carry the parallel entries to the shift register package and their exterior ends will be terminated in probes. The holding mechanism and the probe tip structure will be identical to that disclosed in the aforementioned patent application. As in the case of the serial probe structure, the parallel probe units will be supplied with cable of various lengths, equipped with matching connectors to connect the modules together and to display unit.

In addition to the aforementioned parallel and serial modes of display, the subject system is also capable of providing a mod 2 addition mode in which the uppermost display register will display the mod 2 sum of the contents of its storage register in association with that in the second uppermost storage register.

The mod 2 display mode is useful for comparing two signals, since the mod 2 will be a 1 only when the signals have different logic values. Thus, if it were desired to compare two input signals one of which represented a desired input and the other one an actual input, the two could be added mod 2 in the subject system with the output trace displaying only the times the signals were in disagreement.

The mod 2 mode of display is particularly useful when used in conjunction with a "trap" signal from the trigger source 28 of FIG. 1. Such a trigger signal functions in a complementary sense to the conventional trigger signal in that it will terminate a display sequence rather than initiate it. In the normal trigger mode, the system does not accept data for display until it has received a trigger signal. In the trap trigger mode, the system accepts data consistently but commutates it into the storage and display registers only after the trap trigger signal is obtained. Thus, if the trap trigger signal represents the output of the mod 2 mode of display for two other input signals, then the display initiated by the trap trigger signal would represent events occurring in the system being monitored just prior to the occurrence of the trap signal. This mode of operation would have particular application for diagnostic purposes in that error conditions could be duplicated and the operative results of the various portions of the system predictably analyzed thereby.

In such capacity, the displayed signals correspond to the condition of the various elements being monitored when the error occurred and would thus be indicative of the conditions causing the erroneous performance.

In the implementation of the trap trigger mode of operation, the normal trigger flip-flop of the control unit 23 is held in its "run" position and the delay counter 24 bypassed so that it cannot influence the operation of the system. The display counter 25 is made to run continuously allowing sample pulses to enter the commutator to sample the input data. An additional flip-flop not shown is added to the system to inhibit the operation of the commutator and permit the generation of a dump signal to load the results of the commutations into the storage and display registers. Generation of a display dump signal will initiate the normal reset sequence and the system will return to its reset condition.

In its simplest form the display mode control means 30 of FIG. 1 constitutes conventional switching circuitry with associated selection means to effect the desired mode of operation. In more complicated systems, means may be provided to automatically select the particular signal attribute to be displayed in accordance with a predetermined scanning sequence.

It will be apparent from the foregoing description of the present invention that there has been provided an apparatus for analyzing and displaying digital information in a manner which is both new and novel. Although in the original application the information being monitored is of a digital variety it should be readily apparent that the principles of the present invention are equally applicable to the monitoring of an analog waveform. In this respect, the basic principles of the present invention may well be applied to the analysis and display of any waveform, analog or digital, independent of its transfer rate. This latter consideration constitutes a critical limitation to conventional CRT display systems but is not applicable to the present invention due to the characteristic sampling technique practiced therein.

Other changes to the preferred embodiment of the present invention may be made without departing from the spirit of the invention. Such changes should be obvious to those having ordinary skill in the art. Thus, the storage and display registers of FIG. 4 have been described as utilizing conventional indicator lamps. As an alternative, it is possible to use light-emanating semiconductor elements in place of the conventional indicator lamps. Such light-emanating semiconductor elements are commonly constructed of gallium arsenide. In addition to their size advantage and economy of operation such light-emitting semiconductor elements have the added advantage of being self-contained insofar as driver circuitry, biasing means, etc., are concerned.

The display techniques of the present invention also permit color coding of the plural probes to match the corresponding ones of the multiple storage and display registers. The color coding of the display itself is effected by positioning differently colored transparencies in front of the various storage and display registers. These transparencies may be mounted on the display panel used to mount the various storage and display registers. The display panel is of opaque material and has a pair of horizontal slots extending across the face thereof. The pair of horizontally extending slots correspond to the binary nature of the information to be displayed. As such the pair of display lamps corresponding to a particular display interval of the storage and display register are positioned one over the other and juxtaposed with respect to the two slots such that the corresponding portion of the upper slot is illuminated to illustrate a binary 1 condition while the corresponding portion of the lower slot is illuminated to depict a binary 0 condition. A baffling arrangement is provided to localize light from the display lamps to the appropriate portions of the slots. In this manner, the display representation corresponding to a particular source of information signals will appear as a solid or broken line extending across the face of the display panel. A portion of the display representation is depicted in association with the storage and display registers 21 of FIG. 1.

Although the present invention has been implemented in a manner to facilitate the display of binary coded information, the principles of the present invention are equally applicable to display apparatus having a multiplicity of discrete display levels.

While in accordance with the provisions of the statutes there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. A data analysis and display device adapted to display portions of a waveform, comprising a source of signals definitive of a waveform to be displayed, storage and display means, switching means for periodically sampling said source of signals and for connecting said sampled signals to said storage and display means, said storage and display means including means to establish the display representation of a sampled signal at one or another of two levels in accordance with the binary significance thereof, and control means responsive to a trigger signal to initiate said sampling and switching operation, said last-named means including means for varying the rate of sampling of said source of signals to thereby increase or decrease the relative proportion of the waveform displayed.

2. A digital data analysis and display device for displaying in the form of digital waveforms signals derived from a plurality of input probes, each of said input probes corresponding to a separate source of digital data, a plurality of storage and display registers, switching means for selectively transferring information signals representative of said digital data from a particular one of said plurality of input probes to a corresponding one of said plurality of storage and display registers, control means for generating control signals for effecting the switching of said switching means between the various signal sources and the corresponding storage and display registers, said control means further comprising first counter means for varying the rate of sampling of each of said sources of digital data and second counter means for varying the time delay between the switching to a particular one of said sources of digital data and the first transfer of an information signal therefrom to the corresponding display register.

3. In a data analysis and display system of the type designed to display input-information as discrete representations, the combination comprising display means, a source of data signals, means to selectively sample said source of data signals and to transfer information signals representative thereof to said display means; said last-named means further comprising a source of control signals, means connecting said source of control signals to said selective sampling and transfer means, first counter means to control the display rate of said information signals, and second counter means to control the time delay between the first occurrence of a data signal and the first transfer of an information signal representative thereof to said display means.

4. A data analysis and display device for displaying a waveform comprising a plurality of input probes each of said input probes corresponding to a separate source of data, a plurality of storage and display registers, switching means for selectively transferring information signals representative of said data from a particular one of said plurality of input probes to a corresponding one of said plurality of storage and display registers, control means, said control means further comprising means responsive to externally or internally generated trigger signals to initiate the generation of control signals for effecting the sampling of said sources of data and for the switching of said switching means between the various signal sources and the corresponding storage and display registers, said control means further comprising means for varying the rate of sampling of each of said sources of data and means for varying the time delay between the occurrence of said trigger signal and the transfer of the first information signal from a particular one of said sources of data to the corresponding display register.

5. The apparatus defined in claim 4 and further comprising means to detect signal transitions in the data not otherwise displayed.

6. The apparatus defined in claim 4 and further comprising means to compare the periods of the sampling signal with that of the information signals and to give an indication when the periods thereof are not harmonically related.

7. A data analysis and display device adapted to display selective portions of a waveform, comprising a source of digital signals definitive of said waveform, storage and display means, switching means for periodically sampling said source of digital signals and for transferring said sampled signals to said storage and display means, and control means for initiating said sampling and switching operation, said last-named means further comprising means to vary the rate of sampling to increase or decrease the portion of a waveform displayed.

8. Apparatus defined in claim 1 wherein said last-named means further comprises means for varying the time delay between the occurrence of said trigger signal and the transfer of the first sampled signal from said source of signals to said storage and display means.

9. The apparatus defined in claim 7 wherein said waveform to be analyzed and displayed represents a serialized train of digital signals emanating from a single source or signals representative of a number of parallel outputs from different sources.

10. A data analysis and display device adapted to display selective portions of a waveform, comprising: a source of signals definitive of a waveform selective portions of which are to be displayed, storage and display means, means including switching means for periodically sampling said source of signals and for transferring said sampled signals to said storage and display means, said last-named means further comprising means responsive to an externally generated trigger signal to initiate the generation of control signals for effecting the sampling of said source of signals and the transfer of said sampled signals to said storage and display means, and means for varying the time delay between the occurrence of said trigger signal and the transfer of the first sampled signal from said source of signals to said storage and display means.

11. The apparatus defined in claim 10 wherein said last-named means further comprises means for varying the rate of sampling of said source of signals.

* * * * *